United States Patent
Friskney et al.

(10) Patent No.: US 7,400,583 B2
(45) Date of Patent: Jul. 15, 2008

(54) DETERMINING AND USING VALUE OF TRAFFIC RELYING ON A GIVEN COMPONENT OF A COMMUNICATIONS NETWORK

(75) Inventors: Robert Friskney, Harlow (GB); Simon Parry, Harlow (GB); Adrian Sparks, Ongar (GB); Nigel Davis, Edgware (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 952 days.

(21) Appl. No.: 10/261,069

(22) Filed: Sep. 30, 2002

(65) Prior Publication Data

US 2004/0062205 A1 Apr. 1, 2004

(51) Int. Cl.
*H04L 12/26* (2006.01)
(52) U.S. Cl. .................................. 370/235; 370/395.43
(58) Field of Classification Search ......... 370/229–135, 370/238, 237, 227, 228, 230, 235, 238.1, 370/395.43, 395.21, 252; 709/224, 234, 709/235, 241
See application file for complete search history.

(56) References Cited

U.S. PATENT DOCUMENTS 5,659,779 A * 8/1997 Laird et al. ................. 709/226
6,226,111 B1 * 5/2001 Chang et al. ................... 398/9
6,678,371 B1 * 1/2004 Flockhart et al. ....... 379/265.02
2002/0019866 A1 2/2002 Linzy

FOREIGN PATENT DOCUMENTS

EP 1111840 A2 6/2001
WO WO 02/080459 10/2002

OTHER PUBLICATIONS

U.S. Appl. No. 10/109,949, filed Mar. 29, 2002, Davis et al.

* cited by examiner

*Primary Examiner*—Brenda Pham
(74) *Attorney, Agent, or Firm*—Barnes & Thornburg LLP

(57) ABSTRACT

A system for monitoring a communications network generates a total value figure, using a store of value information. The system can identify which of the monitored flows of traffic rely on a given one or more of the components of the network, and generate a total value of all the identified flows. This type of value information can be easier for network operators to interpret because the information is more direct, and more explicit. Also, many specific rules/warnings about reconfigurations need not be provided. Values can be sent to remote field workers, or used for network configuration, network planning, and financial reporting.

16 Claims, 4 Drawing Sheets

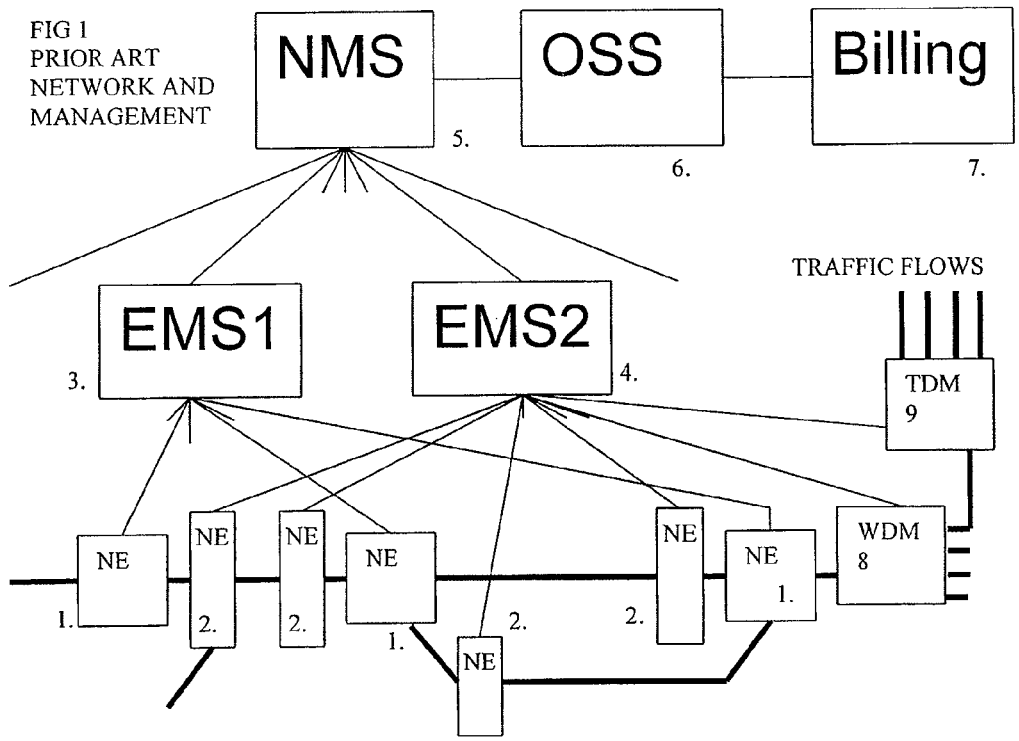
FIG 1 PRIOR ART NETWORK AND MANAGEMENT
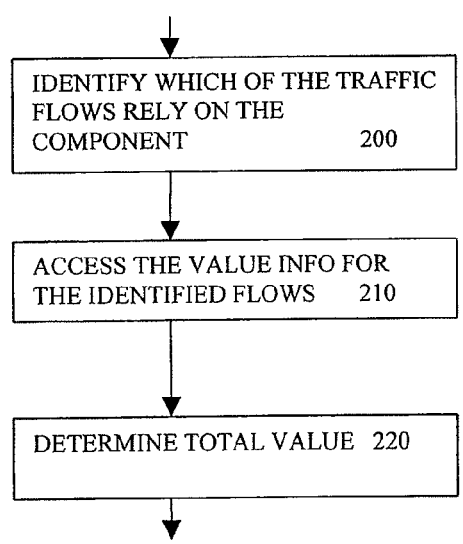
FIG 2 FUNCTIONS OF MONITORING SYSTEM TO GENERATE VALUE INFO FIG 3 INPUTS TO MONITORING SYSTEM AND
USES OF VALUE INFO GENERATED
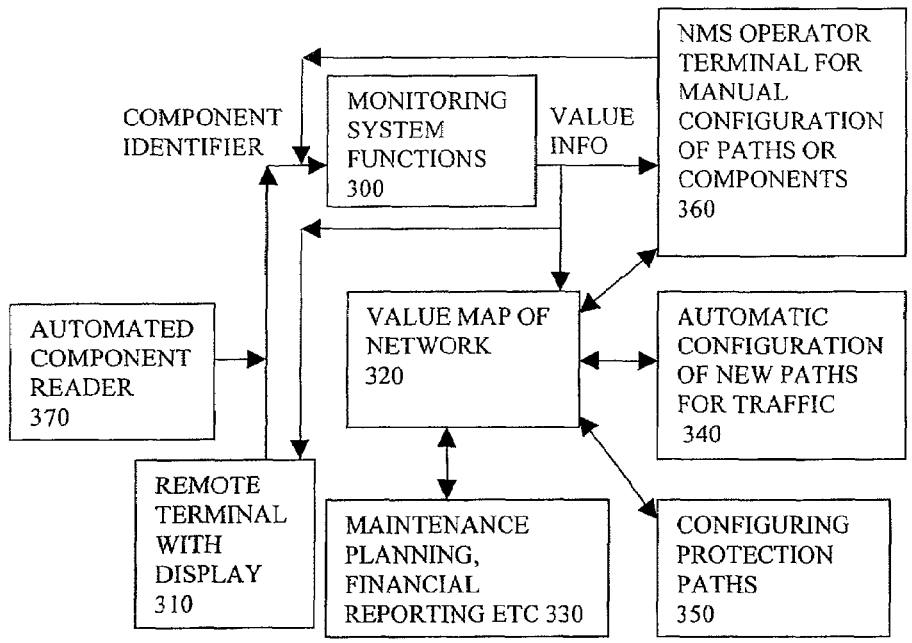
FIG 4 MONITORING SYSTEM FUNCTIONS CARRIED OUT BY E.G. NMS
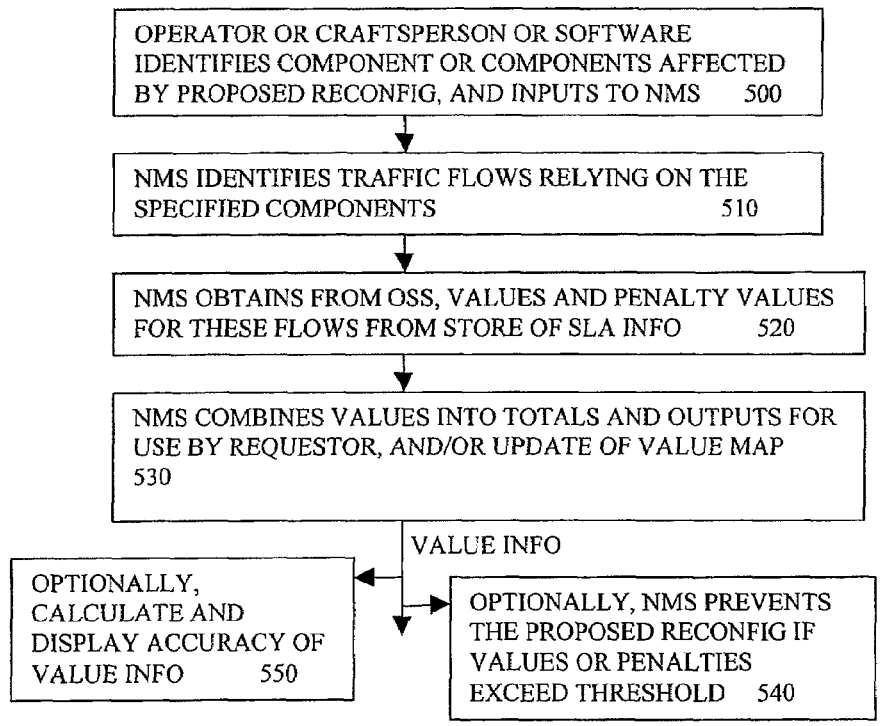

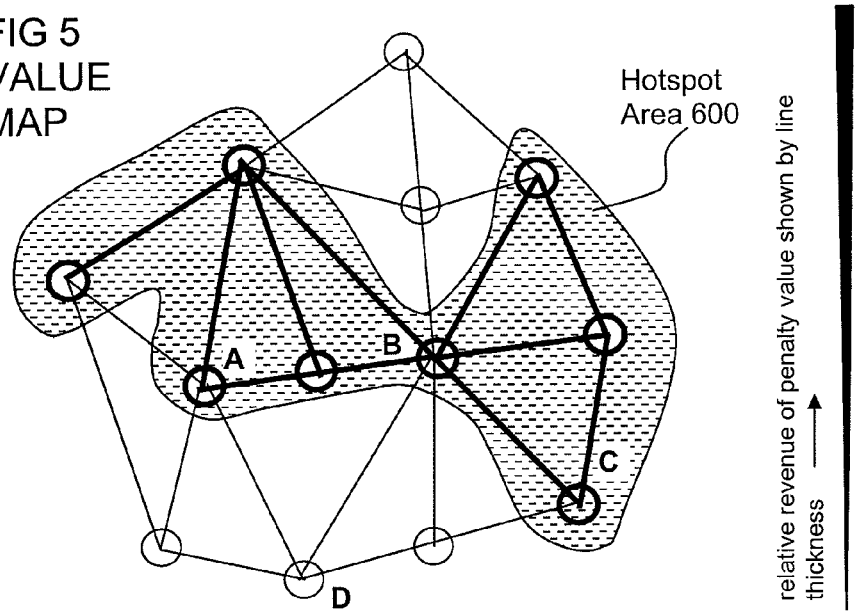
FIG 5 VALUE MAP
Hotspot Area 600
relative revenue of penalty value shown by line thickness
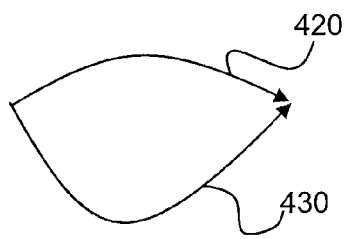
FIG 6, 1+1 PROTECTION
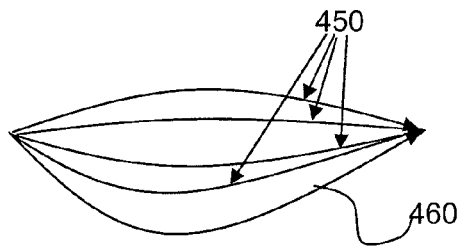
FIG 7, 1:N SHARED PROTECTION
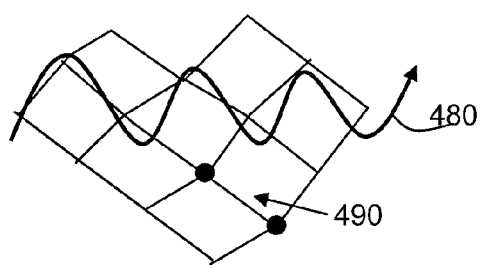
FIG 8, MESH PROTECTION

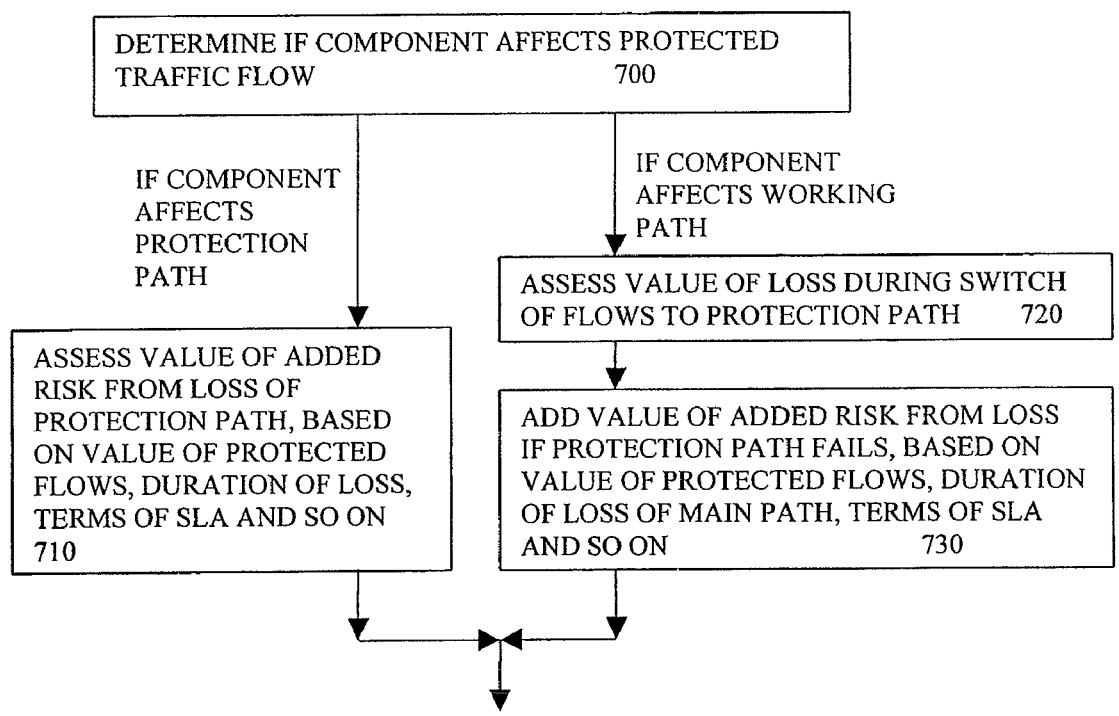
FIG 9 ASSESSING VALUE OF LOSING PROTECTED TRAFFIC FLOWS

DETERMINING AND USING VALUE OF TRAFFIC RELYING ON A GIVEN COMPONENT OF A COMMUNICATIONS NETWORK

FIELD OF THE INVENTION

This invention relates to systems for monitoring a communications network to generate value information, to network management systems for configuring paths for flows of traffic, or for configuring protection paths for flows of traffic, using such information, to methods of using value balanced networks, to methods of using value information for determining cost benefit ratios, to systems for alerting a craftsperson at a remote location of information relating to traffic flows, and to corresponding methods and software.

BACKGROUND TO THE INVENTION

It is known that a key part of almost any communications network is a service management system. It typically carries out functions such as monitoring network performance, monitoring component performance, keeping track of versions of components, configuration of configurable components, recording and scheduling maintenance at remote sites, and reconfiguring the network to take account of changing traffic patterns or planned or unforeseen outages of components, including cards, racks, equipment bays, or fibers or other transmission lines.

Such service management functions can in principle be centralized or distributed amongst the nodes of the network. An example is shown in US patent Application 20020019866 A1 (Linzy), Feb. 14, 2002 entitled "System and method for monitoring and maintaining a communication network", which shows monitoring and maintaining a communication network and the capability to determining connection and configuration parameters of network elements, and monitoring performance characteristics of network elements to recognize faults within the communication network. Another typical configuration of service management functions for a long haul optical network is shown in FIG. 1. It is essentially centralized at a remote location, communicating with each of the components at the nodes of the network via management communication channels. These typically form a management network, for example using Ethernet or other well known network layer protocols, using physical paths such as leased lines of the public telephone network, or dedicated wavelengths on the fibers used for the traffic between nodes of the network.

The service management functions typically include a network management system NMS, a number of element management systems, EMS, coupled to the NMS. There is also an operational support system, OSS, coupled to the NMS. A billing system is also shown, coupled to the NMS via the OSS. The main function of the EMS is to perform detailed monitoring and management functions upon the limited subset of equipment types that it understands. The main function of the OSS is to maintain operational and non-operational records (e.g. Service Level Agreements [SLAs]) regarding services. The main function of the NMS is to provide an integrated view of network and service operation, as well as overall control functions.

The coupling to the billing system enables the billing system to receive information from the network, for automated billing according to criteria set out in contracts called service level agreements SLA. These criteria can include for example quantities of traffic transmitted, or penalties for lost traffic, or penalties for lack of available transmission capacity for more than a given period and so on.

The penalties for lost traffic or lack of capacity to meet an agreed SLA can be very significant. Normally the network management system enables operators to determine how much capacity is available and ensure that proposed SLAs can be met before they are agreed. To allow for unforeseen outages caused by equipment failures, redundant capacity is provided which can be switched in automatically.

One of the more significant sources of heavy penalties for breaches of SLAs is disruptions caused by incorrect actions taken by operators of the network management system or by craftspeople working on the hardware at remote locations, under the direction of the operators.

A crafts person accidentally disconnecting the wrong linecard in a transport system can cause vast financial penalties and/or extra work to the operator, due to the disruption to paying traffic violating service level agreement penalty clauses. Even if the traffic is automatically re-routed onto a protection path, or a shared protection path, major disruption can still be caused by another failure or unavoidable maintenance activity on the now un- or less-protected traffic. More disturbingly, an operator of a remote network control/management system can accidentally send configuration commands with a similarly damaging effect by accident and/or misunderstanding the display in front of them. This is particularly unfortunate, as nobody but the management operators is checking for service interruptions. These problems or risks are particularly acute where the network includes high capacity links where many hundreds or thousands of connections are aggregated or multiplexed over a single fiber, but can occur in any network having some degree of complexity.

Efforts to reduce these risks have included providing warning messages on screen for operators to say "are you sure" before a reconfiguration action is carried out—but these give no more information to help reconsider the decision and thus are often clicked without further thought. For craftspeople, warning indications have been shown on each card or rack. For example red LEDs on the front of failed circuit packs to show that they are out of service and thus can be pulled without fear of interrupting service are a very effective standard industry technique. However, this does not cover the plethora of circumstances where this LED doesn't show but the card is still ready to be pulled: where the wrong sort of card has been plugged in, where the card is misconfigured, where all (or most of) the traffic has been re-routed to not pass through the card, where the card has failed to detect its own failure—perhaps it is performing but only marginally etc.

Even the red LED technique can't help in situations where maintenance or reconfiguration or provisioning is being performed remotely. While it is to be hoped that network management software would be aware of the presence or absence of the fault, craft terminals or other applications not directly integrated with the NMS may not display this to the operator and thus still reconfigure the node/pack in error. Even where the indications are accurately displayed, their significance may not be clear to the operator, as described in the previous paragraph. Yellow 'warning' LEDs have been fitted in an attempt to provide more helpful information, however there is substantial concern that these do not provide actionable information—i.e. "you can pull this card now".

In co-pending U.S. application Ser. No. 10/109,949 (Nortel Networks ref 15027ID) filed Mar. 29, 2002, there is shown a method for determining the impact on a network of a fault, involving constructing a layered topological model of the network according to a predetermined protocol, receiving an indication of the fault, and modelling the impact on the network and its services resulting from the event. The modelling step may include applying a priority weighting to the fault to determine a priority order in which to attend to a sequence of faults. The priority order can be based on the cost effectiveness of rectifying the faults.

SUMMARY OF THE INVENTION

It is an object of the present invention to provide improved apparatus and methods. According to a first aspect of the present invention, there is provided a system for monitoring a communications network, the network being made up of many components, and being arranged for carrying many flows of telecommunications traffic, having different values, the system being coupled to the components to monitor the flows in the network, and being coupled to a store of value information based on one or more service level agreements relating to at least some of the flows, the value information indicating one or both of a positive revenue from the successful operation of the flow, and a negative revenue if the flow is degraded, the system having:
  a flow identifier for identifying which of the monitored flows of traffic rely on a given one or more of the components, and
  a valuer arranged to determine a total value of the identified flows from the store of value information relating to the identified flows.

One advantage of being able to generate this type of value information is that it is easier to interpret because the information it gives to an operator is more direct, more explicit than the detailed complex information from which it is derived. Also, many specific rules/warnings need not be provided because a value such as a cash-flow figure or figures will always tend to guide an operator to the action that best aids their business. It can be relatively easy to calculate such a figure for any action for which it is possible to determine which flows, e.g. connections, will be disrupted. The total values can be generated in response to an individual query or generated and updated continuously or periodically. They can be generated anywhere, and sent wherever required. There are a wide range of uses for such value information. The values can be further modified to suit particular applications, by factors such as degree of degradation or duration of outage, which can make a critical difference to the value.

The inventors have appreciated that conventional service management functions are currently blind to the value of the traffic or loss of it, as the value is frequently not directly related to the quantity of traffic. The inventors also appreciated that better decisions could be made if a financial consequence of any change or disruptive action is available. Operators and craftspeople currently have inadequate information or insufficiently clear information in this respect.

The term "component" is intended to encompass anything such as nodes, links, fibres, racks, shelves of cards, cards, parts of cards, integrated circuits, optical components, software modules, logical IP VPN (virtual private network) and so on. It also encompasses components not directly in-line which nonetheless may have impact, and thus disruption value, e.g. the air-conditioning for the central office, where some components are at the top of their working temperature range, or components in a protection path.

The total values can be determined or stored for a high level set of components, such as a series of links, then used for, or propagated to, all components making up that set, such as fibers, racks, amplifiers and so on. This can enable the system to use knowledge of a hierarchy of the components (often already known by a network management system) to generate value information more easily. The term "degraded" is intended to cover total loss of the flow, or less than total loss of transmission, including bit errors, which may be recoverable.

One subset of the embodiments of the invention has an additional feature of the system being coupled to a display and being arranged to display the total value on the display.

Such a display can be a great help in reducing expensive inadvertent disruptions caused by any sort of manual intervention if displayed before the given one or more components is tampered with, or if displayed afterwards, but in time to remedy the disruption. The values may be displayed in various forms, not just a financial value, including an indication of whether a value threshold has been exceeded, or an indication of consequences such as "so valuable that disrupting it will cause summary termination of employment". The display encompasses display on the component, on a remote terminal, a mobile phone, an operator console, or other examples.

Another subset of the embodiments of the invention has an additional feature of an interface arranged to receive a request identifying the given or more components and arranged to send the total value to a remote terminal for display.

Alerting of such remote terminals is particularly useful to alert craftspeople working in the field at remote locations. Such alerts are particularly important because the risks are high since drastic initial configuration is usually carried out in the field, frequently on new equipment immediately adjacent to working equipment which may appear similar. Also, fewer precautions are taken since it is usually assumed there is no traffic on the new equipment. However, now some of the initial configuration can be carried out remotely, and so that assumption may no longer hold. If a network manager has instructed a craftsperson to pull a card, but has accidentally failed to re-route the traffic going through it, this scheme can alert the craftsperson to wait—or perhaps perform less dangerous jobs first. The sending encompasses any convenient method, including sending by email, SMS (short message service), pager, by voice call to a mobile phone, and so on.

One subset of the embodiments of the invention has an additional feature of an interface for coupling to a centralized network reconfiguration system, the display being on an operator terminal of the reconfiguration system.

This is particularly useful as warning display relating to a component or components proposed to be reconfigured to counter inadvertent disruptions by network operators. One subset of the embodiments of the invention has an additional feature of an interface for coupling to a centralized network reconfiguration system to enable reconfiguration of the given one or more components only if the total value does not exceed a pre-determined threshold.

This can enable a further degree of reassurance, or facilitate network operation with less experienced operators. It also can apply to software driven reconfiguration, to give more reassurance where the software is untested, or as is commonly the case, is too complex and expensive to test exhaustively.

One subset of the embodiments of the invention has an additional feature of a value map generator arranged to determine the total values for many of the components, to create a value map of part or all of the network.

Such a map indicating value hotspots in a network has many uses, including short term decisions on how to route new traffic, to avoid the hotspots, medium term network configuration decisions to give better "value balancing" of traffic and of protection paths, and maintenance downtime planning, financial reporting, and long term decisions on capital expenditure on the network. If these activities are manual then the value hotspots can be displayed, if the activities are automated, the hotspots can be input as data to the process.

One subset of the embodiments of the invention has an additional feature of, the network being a wide area optical wavelength division multiplexed transport network. This includes future wavelength routed networks, which may have routing configured automatically. Other examples of networks include a VPN-enabled IP network, and an ATM network.

One subset of the embodiments of the invention has an additional feature of an adjuster arranged to determine if the identified flows have protection paths not relying on the given one or more components, and if any of the flows rely on the given one or more components not for transmission but only for a protection path, and to adjust the total value accordingly.

One subset of the embodiments of the invention has an additional feature of an adjustment taking into account how long the given component could be degraded. This time factor can be significant for assigning a value to a protected flow, as the loss of the protection path may cause no actual loss of data, but merely an increase in the risk of data loss.

One subset of the embodiments of the invention has an additional feature of an accuracy determiner arranged to determine a level of accuracy of the total value. This could be particularly useful where for example the values are very unstable, or where there is no value information available for a proportion of the flows passing through or relying on the given component.

A second aspect of the invention provides a method of monitoring a communications network, the network being made up of many components, and arranged for carrying many flows of telecommunications traffic having different values, the system being coupled to the components to monitor the flows in the network, and being coupled to a store of value information based on one or more service level agreements relating to at least some of the flows, the value information indicating one or both of a positive revenue from the successful operation of the flow, and a negative revenue if the flow is degraded, the method having the steps of:

identifying which of the flows of traffic rely on a given one or more of the components, and determining a total value of the identified flows from the store of value information relating to the identified flows.

This aspect claims explicitly the corresponding method steps in case they are offered as a service and prove more valuable than the system.

A third aspect of the invention provides a network management system for configuring paths for flows of traffic in a communications network, the system being arranged to:

access information indicating total value of current flows of traffic at a number of different points in the network, and configure the paths to provide a more evenly value balanced network.

Avoiding value hotspots by better value balancing can serve to reduce the risks of high penalties caused by inadvertant loss of traffic. It can take the form of routing new flows away from hotspots, or rerouting existing high value flows which contribute to the value hotspots. This particular use of the total values to achieve value balancing is claimed explicitly in case it proves more valuable than the generation of the values, or in case other aspects are carried out outside the jurisdiction of the patent.

A fourth aspect of the invention provides a network management system for configuring protection paths for flows of traffic in a communications network, the system having:

an interface for accessing information indicating total values of current traffic flows at a number of different points in the network, and a configuration component for configuring the protection paths using the information to bias the configuration to provide better protection for points having higher total values.

This can represent an alternative or a complementary way to that of the above aspect, to handle value hotspots to reduce the risks of high penalties caused by inadvertant loss of traffic. Configuring the protection paths to provide more protection can take the form of reducing the amount of sharing of the protection paths, providing higher grade or higher priority for the protection paths and so on. This particular use of the total values is claimed explicitly in case it proves more valuable than the generation of the values, or in case other aspects are carried out outside the jurisdiction of the patent.

A fifth aspect of the invention provides a method of optimising a network, having the steps of accessing information indicating total values of traffic flows at a number of different points in the network, and providing increased resilience at those points with higher total values.

This can represent an alternative or a complementary way to the third and fourth aspects. Particularly where there is no scope for further value balancing by rerouting paths, then the impact of failure of the higher value points will still be disproportionate. However this can be mitigated and value balancing improved by providing increased resilience to reduce the likelihood of a failure, and so enhance availability. Increasing resilience can be achieved by upgrading hardware, improving maintenance and so on.

A sixth aspect of the invention provides a method of using a value balanced communications network, having the steps of:

a customer agreeing a service level agreement indicating a value or a penalty value of flows of traffic, with an operator of the value balanced network, and sending one or more traffic flows relating to the agreement over the value balanced network.

As the benefits of the value balanced network may be even greater to the customers than the operators, in terms of revenue, and could prove far greater than the sales value of the equipment over the life of the system. Hence the actions of the customers are claimed explicitly in this aspect.

A seventh aspect of the invention provides a system for determining a cost benefit ratio of a given component of a communications network, the system comprising the monitoring system set out above, and having an averager arranged to determine an average of the total value for the given component over a predetermined period of time, and a ratio determiner arranged to combine the average with a component cost.

This can provide vital information for financial reporting or for justifying or planning further expenditure on expanding, maintaining, or contracting the network.

A eighth aspect of the invention provides a system for alerting a craftsperson at a remote location of information relating to traffic flows currently flowing through or relying on a given component of a communications network, the system having:

a component identifier arranged to send information identifying the given component to a monitoring system as set out in claim 1, and a value sender arranged to send the total value generated by the monitoring system to the remote terminal for use by the craftsperson.

This can address one of the higher risk activities, and enable more direct and up to date information to be presented to the craftsperson, for reassurance that their actions will not be disrupting valuable traffic. The total value can be sent in any manner, including by email, SMS, pager, voice message and so on.

One subset of the embodiments of this aspect of the invention has an additional feature of an arrangement for automated entry of the information identifying the given component.

Other aspects of the invention include software for implementing the system or any parts of it, or for carrying out (which encompasses controlling) the method steps. This acknowledges that such software can be a valuable, separately tradable commodity. For similar reasons, it is also intended to encompass software which "describes" or defines the configuration of hardware, such as HDL (hardware description language) software, as is used for designing silicon chips, or for configuring universal programmable chips, to carry out desired functions.

Any of the preferred features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 1 shows a prior art network,

FIG. 2 shows functions of a monitoring system according to an embodiment of the invention, FIG. 3 shows inputs to the monitoring system and uses of the value info generated, according to embodiments of the invention, FIG. 4 shows monitoring system functions carried out by e.g. the NMS of FIG. 1, according to embodiments of the invention, FIG. 5 shows a value map according to embodiments of the invention, FIGS. 6-8 show conventional protection schemes, and FIG. 9 shows steps in assessing value of protected traffic flows according to embodiments of the invention.

DETAILED DESCRIPTION OF PREFERRED EMBODIMENTS

A lot of information from communications systems is highly specific, arcane and/or ambiguous and is thus often misinterpreted by operators, particularly at a brief glance. This is substantially because these signals/messages relate to the functioning of the equipment rather than the fundamental purpose of having that equipment there: to provide valuable services. For instance, converting 'Pump laser X has failed, backup laser Y activated' into action is not clear to somebody unfamiliar with the equipment: Should I order a new pack? Should I get somebody to check it out first? Should I pull it immediately before the rest of the rack overheats?

However, most human operators/craftspeople likely to be interpreting these signs have an intensely well-developed ability to interpret significance in one area: How much will this cost me? Hence embodiments of the invention convert equipment operating conditions into a display of the value of the traffic currently passing through the equipment and thus whether it is (financially) safe to take the equipment out of service for whatever reason.

FIG. 1 shows a conventional network and service management functions, to which the embodiments described below can be applied.

Diagram Key:

1. A network element (e.g. a terminal card bay)—NE—compatible with element management system #1.
2. A network element (e.g. amplifiers)—NE—compatible with element management system #2—but not compatible with EMS #1.
3. EMS #1—Element Management System #1. A software application designed to manage a certain sort of network element, shown with logical links to NEs of type 1.
4. EMS #2—Shown with logical links to NEs of type 2.
5. Network Management System—NMS—shown with logical links to all element management systems. This software application gives an overview of the functioning of the whole network. Specifically, this application shows end-to-end services.
6. Operations Support System—OSS—a database of machine-readable contract information related to services—e.g. service level agreements. Conventionally this can be coupled to the NMS in one direction to enable the OSS to receive information from the NMS about amounts of traffic carried or about service failures, to enable the OSS to calculate automatic discounts or debits for use by the billing system.
7. Billing system—the software that invoices and accepts payment from customers.
8. WDM (wavelength division multiplexer and demultiplexer).
9. TDM (time division multiplexer and demultiplexer)

This is a logical view, rather than a physical view. Some components may well be integrated, e.g. OSS & Billing, EMS & NMS. Terminology is loosely defined and thus other bodies may have different names for these functions.

Regarding EMS/NE compatibility, each EMS will have a set of sorts of NEs that it can manage. These are likely to be related products from a single manufacturer. Substantially different products from the same manufacturer, or products from a different manufacturer will probably need their own EMS. Thus it is usual to have a number of EMS's to support all of the components in a network.

As can be seen, many traffic flows are carried, in this case by the TDM and WDM devices. There may be many hundreds or thousands of flows, such as packet streams for internet traffic, virtual circuits for telephone calls, and so on.

Note it is quite possible to run entirely independent overlay networks—e.g. where the network pictured could be the 10 Gbps optical transport network, it would be quite normal to run a PSTN voice system (having its inter-switch links and own NMS and own billing system) over the transport network but with no visibility between the two NMSes.

FIG. 2 shows functions of a monitoring system according to an embodiment of the invention. At step 200, some part of the service management functions, preferably the NMS, identifies which of the traffic flows pass through a given component or rely on it. At step 210, the value information for those flows is accessed, and at step 220, a total value which can be a total penalty value is determined by combining all the values for all the flows passing through or depending on the component.

This may be repeated periodically to update the totals, or to produce time averaged totals. It may be repeated for different components.

FIG. 3 shows inputs to the monitoring system and uses of the value info generated, according to embodiments of the invention. The monitoring system for generating the value information is shown by element 300. A principle input to it is the identity of the given component, which can come from the NMS, either from automated configuration or planning processes, or by manual input from an operator terminal 360. Another source is a remote terminal 310 of a craftsperson, or an automated component reader 370, such as a bar code scanner or similar. One common difficulty, in terms of identifying components, is identifying which of a bundle of fibers is the right one to cut in order to replace it or insert optical equipment.

One possibility for identifying the correct fiber is to make use of the fact that bending a fiber will cause measurable changes in received optical signal amplitude due to polarization dependent loss (PDL) in later components/fibre. Existing optical monitors are likely to detect them but unlikely to treat them as serious enough to pass an alarm on to the NMS. The NMS can be arranged to request via the relevant EMS that the detector pass on tiny changes in amplitude but only for all the fibers in the right bundle, at the time the craftsperson is working. This can be used to confirm that the craftsperson is handling the correct fiber. This confirmation can be displayed to an operator of the NMS, and/or directly to the mobile terminal of the craftsperson. In addition, or as an alternative, the value information relating to the given component can be output back to the remote terminal, optionally under the control of the NMS operator, and preferably under secure conditions, as the value information could be commercially sensitive.

Another destination for the total values is a stored value map 320 of all or part of the network, which can be held as a database or displayed as shown in FIG. 6 for example. This map, or the individual values can be used in applications such as maintenance planning, or financial reporting, 330 for example. In these cases, values time averaged over days or months are probably more useful than instantaneous values. Other destinations include manual or automatic network configuration applications 340, for which instantaneous values are useful to prevent inadvertent disruptions, and time averaged values are useful for configuring paths for new traffic flows and carrying out longer term (months) planning of capacity, e.g. by lighting unused fibers, and installing new OADMs (optical add drop multiplexers) at intervening points to add or drop traffic flows along an amplified optical path. As one of the more complex and critical network management tasks is planning of protection paths and sharing of them, represented by item 350, this is another application which can benefit from the value information, especially the value map.

FIG. 4 shows monitoring system functions carried out by e.g. the NMS of FIG. 1, to generate the value information. At step 500, the identity of the component is received by the NMS. At 510, the NMS identifies from its own configuration records of traffic flows, which of the traffic flows rely on the identified components. At step 520, the NMS obtains from the OSS, values for these flows from the store of SLA information at the OSS. Where there is insufficient information, the NMS may infer value information, based on flow quantity, obtained from within the NMS. At step 530, the NMS combines these values and outputs these totals as appropriate to the operator, craftsperson or automated process, and/or the value map as requested. At step 540, optionally, the NMS can be arranged to prevent a proposed reconfiguration if values or penalties exceed given thresholds. These thresholds may depend on the qualifications or seniority of the person requesting the reconfiguration. At step 550, optionally an indication of the accuracy of the values is calculated and displayed. On private networks where there are no external customers and thus no direct $ impact of a disconnection, even where there is no appropriate accounting rate, the significance of money flow is still a very powerful indicator and thus, provided that services are allocated some approximate indicator of their significance in cash value, this can still be translated into a very simple, easily interpreted indicator of the current operation of a piece of equipment.

Another use relates to the problem of accidental violation of SLAs without realising it: e.g. when things aren't put back together properly after a planned maintenance outage and the operator fails to realise that one circuit didn't get re-provisioned. A compelling way of pointing this out unambiguously is a counter showing the cost of the penalty clauses being incurred or contracted revenue being lost at the top of the management screen steadily incrementing! A click-through arrangement then takes the operator to the particular SLAs being violated and why. As some problems might take a while to solve, these could then be attached to the job control system such that they were removed from the count of penalties incurred—however, the financial significance of resolving a job sooner rather than later can be easily calculated by the job control system, and used to prioritise such maintenance work to do the most valuable work first. When the workman tries to close the job, to indicate it is complete, the SLA would automatically be re-checked to ensure that the problem had actually been solved and the workman notified if not. This can prevent many of the obviously undesirable cases where the customer is told the service is working when it isn't.

Another use is in financial analysis. In the case of mixed-traffic-type networks (e.g. data and voice networks), particularly at the highly aggregated top level (e.g. the OC192 network), it is not necessarily clear which parts of the network are providing most revenue. This system, particularly the value map, could make this immediately visible. Indeed, it can make all sorts of financial analysis of the network much more immediately available.

Another variant where value information is not available for some of the traffic flows, is to estimate value for at least some of the traffic flows by using other flow information, such as packet count or byte count or non-empty frame count. This could be displayed directly, or converted to a value figure, and combined with the other value information. In any case, the proportion of the value which is estimated gives an idea of the accuracy of the value figure, and this accuracy information is useful and could be displayed if desired.

Where the information is displayed is also an issue. While it could be displayed on the face of the equipment for craftspeople working in the field, this is often difficult to achieve owing to the high premium placed on compactness. Accordingly it may be more convenient to display it on a mobile terminal such as a laptop computer, or handheld device such as a mobile phone. Display on operator display screens at a central network management facility is also useful. Currently at the network management level there is little visibility of the operation of higher layers (e.g. an OC192 network would observe that there were no packets coming down an OC48 from an IP server farm and perhaps see if they really had connectivity with a particular router).

A further use for this sort of significant value information in the medium and long term is in making policy decisions which must currently be deferred to the operator—or ignored.

The ramifications of this are substantial, but here are a few examples of where this could be useful:

Shared or mesh protection designed for single faults—what to do if a second fault occurs.

Decisions on a new circuit, which needs an unusually large amount of equipment and/or could significantly compromise the network's future capacity. Is this a contract the operator can afford to say "no" to?

Where the current load on the statistically-multiplexed network is ~70%, is it time to spend on an upgrade? If it's mostly internet traffic then no—the high-priority stuff will still get through—but if there is even 50% premium VPN traffic, an upgrade is urgent. Although this could be encoded by specific rules, the point is that with a simple $ count, it's immediately obvious to somebody looking at the network, without having to plug in specific rules for each case.

Currently, service level agreements with penalty clauses can be coded into software systems such that billing rebates can automatically be made on receipt of an appropriate alarm sent through the network management system. Assuming that this basic contract information is already present in a billing system that is linked to the network management system, the $/bit or $/second value of each service being offered can be extracted quite readily. This can be translated in various more-or-less sophisticated ways (see below) into the $/second value of each provisioned path. Taking a sum of the value of the paths passing through any given equipment-equipment link then gives the revenue currently being earned that would be disrupted by that equipment ceasing to function. At some stage in this calculation, the information will be propagated to the equipment or just to the network management console, as appropriate.

This information is thus displayed as either a static sum or a cumulative total. Physical equipment can have a display near the points of manual intervention (e.g. on a card, near the card extraction tabs, on a rack, next to the power switches). With network management software displays, it may be undesirable to display the information all the time on the summary network view, but instead on menus/dialogues with device configuration control—i.e. on the screen views where the damage can be done if there is insufficiently clear information.

As part of the normal management and control function, traffic flows are monitored for existence in many places. Where they cease—whether through failure, deliberate provisioning action or whatever means, the NMS can now recalculate the values of all relevant components on all of the equipment they traverse. Such notifications of traffic flow loss follow normal telecommunications aggregation paths, i.e. with overlaid networks (PSTN over E1 over STM1 over OC192) the higher-capacity networks only get aggregated notifications.

Thus, if a craftsperson goes to pull a card, they will immediately see whether all the traffic has been diverted from it (the revenue counter is static) or not—maybe the network management has accidentally diverted the wrong traffic, or from the wrong network segment, or maybe the craftsperson has accidentally got hold of the wrong card.

Another scenario is where a large amount of new equipment is being installed and local crafts commissioning is occurring. At this stage of the installation, it is safe and normal to do dramatic provisioning changes. Due to the rats nest of wiring, the provisioning software is accidentally plugged into similar looking equipment that is currently in service. As soon as the craftsperson goes to perform the first provisioning change, they see a huge number going up very fast in the box marked 'consequences of this action' and realise what's happened. Today's situation is that they'd just see configuration data they didn't expect and they might start resetting it to what it 'should' be, resulting in huge losses of traffic.

Synchronising the display with actuality is crucial for the display to be believable. Therefore part of the (de)provisioning process for new (removed) services should include the update of all relevant displays.

FIG. 5 shows an example of a value map of a network made up of a mesh of nodes and links. It shows traffic value 'hotspots' becoming visible. [Note the difference between 'hot' nodes and 'hot' links—the two don't necessarily go together]. Shading of hotspot area 600 containing many high value nodes and links further helps to highlight the value balance or lack of it across a network. This could be extended to show a "contour" map of a number of different value levels. This could be useful for an iterative planning process that worked to spread the risk of the system by evening out its 'temperature'. This is good practice as it will mean that there is much less risk of unexpected large losses caused by a particularly unfortunate fault.

Looking at FIG. 5, links and nodes have been drawn with different line thicknesses according to the revenue of the traffic going through them, the calculation of which has been previously described. Other ways of illustrating this such as using different colours or different line styles are feasible. Although the visualisation of traffic load using colour is well known in the prior art, the revenue metric here provides a new perspective. That is to say, links with several extremely high-value traffic flows will display with a similar degree of 'temperature' to links with extremely high loads of moderate-value traffic flows. It would be possible to set by policy a maximum 'temperature' of a link and trigger the addition of some additional route diversity or perhaps to forcibly rebalance the 'temperature'—offering better load-balancing to very-high-load links and/or better resiliency to high-value traffic.

E.g. in the diagram, assume that a path between nodes A-B-C has 4 highly-lucrative super-high-resiliency banking connections. A traffic placement algorithm looking to place a further high-resiliency connection from A-C would seek to even the temperature out by running the path across an alternative link e.g. via node D—thus reducing or spreading the financial risk represented by any given failure.

Similarly, a network planning tool would see that the link A-B-C represented a severe hotspot on the network and attempt to 'shed' traffic onto other links—either by simply causing planned maintenance and other traffic-disrupting activities to always replace the traffic from A-B-C onto a different route A-C, or by forcibly moving traffic directly. Links could be given different maximum temperatures (or indeed conduction factors) such that e.g. the danger level on a vulnerable overhead fibre was much lower than that on a deeply-buried and heavily armoured coastal festoon.

After the operator had performed all of the temperature-based load-balancing that they cared to do, aggregate temperatures (both mean and peak) could be taken for whole areas of the network and the diagram thus created would show where there was need for any additional link deployment. The diagram shows areas 1, 2 and 3 which have been averaged in this way. The centre of the network (area 2) shows markedly higher average temperature than areas 1 and 3. Thus, extra links within this section may help to better distribute the risk associated with the traffic.

Colouring a diagram as described points out where problem areas are located—where traffic is to be moved away from. While this is a useful tool with a given network topology, when it comes to planning new links, it doesn't offer any real guidance as to where these should most profitably go. When a candidate location for a new route has been proposed, a candidate traffic placement can occur and the resultant temperatures (reflecting value) calculated and mapped—and the resultant drop in average temperature derived. Thus, the effectiveness of a given choice can be easily seen on the map.

Note that temperature is for each shared risk (e.g. a shared duct), so two fibres logically independent but physically in the same duct should be coloured according to the sum or similar combination of their values (and preferably displayed together, for more easy comprehension).

FIGS. 6-8 show some different protection arrangements, with reference to the value which might be attributed to each, where:

FIG. 6 shows a 1+1 protection circuit 420 is the working path.

430 is the protection path.

FIG. 7 shows a 1 :n shared protection system.

450 are working paths 460 is the protection path shared by all the working paths such that once used by one working path, the protection path is unavailable to others, unless a priority scheme is implemented, so that a higher priority working path can take over or bump a lower priority path from occupying the protection path.

FIG. 8 shows a mesh network with mesh protection implemented.

480 is a working path.

490 is one link within the mesh that might (but is not guaranteed) to be part of a restoration action for the working path.

Above has been described how to extract the value of a service. This next section addresses the question of how to map from service value to link value (or rather, the value of the connections carried over that link, or that component which might cause failure in that link). Where the service consists of a single unprotected path, the most obvious mapping is service value=link value. Where services are protected, the question is more sophisticated:

By taking down the protection route, traffic is not actually interrupted at all—but the risk of service interruption is increased in case of a fault on the working path By taking down the working path, there is not necessarily an SLA-violating service outage—because the traffic will be re-routed across protection capacity. This depends upon the size of the traffic impact caused by a successful protection event.

Protection resources may be protecting multiple working paths, and thus multiple services.

As illustrated in FIG. 9, the first step 700 is to determine if the component affects a protected traffic flow or protected path. At step 710, if the component affects a protection path, then there is an assessment of the value of added risk from loss of protection path, based on value of protected flows, duration of loss, terms of the SLA, type of protection, and so on. At step 720, there is an assessment of any loss during the protection switching operation, typically these can take tens or hundreds of milliseconds, so appreciable amounts of data may be lost. At step 730, the additional value of the added risk from loss if the protection path fails, based on value of protected flows, duration of loss of main path, terms of SLA, type of protection, and so on.

Thus, the value placed upon protection paths will depend upon the decision to be made (who is making it, how long it will have an effect) and the policy of the operator. Here are some sample options:

1+1: Working & protection both have the value of the service.

1+1: Working & protection both have half the value of the service.

1+1: Working has the value of the service. Protection has only a small fraction of this value when looked at by crafts-persons with a 10-minute outage on their job-sheet, but the full value of the service to crafts-persons with a complete re-wire on their job-sheet. Similarly, network management buttons can be 'Take down for 10 minutes' rather than just 'Administrative disable' and thus show appropriate values.

1:N systems: Working paths have the value of the service. Protection paths have the value of the most valuable service that they protection (or some fraction of it).

1:N systems: Working paths have the value of the service. Protections paths have the sum of a fraction of the value of all of the services they protect. Note:

Protection paths may end up with a value in excess of any individual working path, despite not carrying any traffic, because their non-functioning so drastically reduces the resiliency of the network.

The question becomes somewhat more complex with mesh protection systems, where—a priori—it is not known which links will be used to protection/restore a working path. In this case, one approach to calculating the mesh link values would be to apply any standard 1:N shared protection valuation scheme, but to sum over (or otherwise combine) the convolution (or other combination) of fault location combination probability data with the topology (given the restoration routing algorithm) to calculate the likelihood of any given link being used to protection each working path. E.g. Over any single link failure in the example mesh network, path 480 is not optimally restored using link 490. However, any person skilled in the art can see several combinations of faults—or a placement of further traffic, or a combination of a previous protection action plus a new fault—which would cause link 490 to be part of the optimal restored route. The probability of each of those event combinations can be summed to get the probability of link 490 being used to restore working path 480. Multiplying this probability by the value that a 1:N shared protection route for path 480 would have gives link 490's value relative to path 480. Summing this over all working paths gives link 490's total value.

This technique is a simplified example for illustration only and thus not necessarily appropriate for an actual network—e.g. its computational intensity scales poorly with large networks and large numbers of working paths. Variations to suit particular implementations, particularly e.g. by aggregating events, links and topology areas will be clear to a skilled implementor, and need not be described here in more detail.

As described above, depending on the form of protection used, a given ratio of the working path cost can be assigned to the protection route. Also, an element of operator policy decision is required: e.g. it may be appropriate to set it such that a protection appears to be positively making money but at quite a low rate (which leads to a reasonable interpretation by an operator or craftsperson that 'I'm not going to get fired for pulling this card, but I'd probably better check my instructions'). Alternatively (or also) it may be set such that a route protecting many paths through a 1:N configuration actually shows a counter going at a far higher rate than the working-path cards. There are many options conceivable.

Concluding Remarks

As described above, a system for monitoring a communications network generates a total value figure, using a store of value information. The system can identify which of the monitored flows of traffic rely on a given one or more of the components of the network, and generate a total value of all the identified flows. This type of value information can be easier for network operators to interpret because the information is more direct, and more explicit. Also, many specific rules/warnings about reconfigurations need not be provided. Values can be sent to remote field workers, or used for network configuration, network planning, and financial reporting. It can be applied to any kind of network including those aggregating many flows by time, frequency or wavelength division multiplexing, of those carrying flows on segregated paths, such as separate fibers in a bundle, or independent radio channels.

Other variations will be apparent to those skilled in the art, having corresponding advantages to those set out above, within the scope of the claims.

The invention claimed is:

1. A system for monitoring a communications network, comprising many components, and being arranged for carrying many flows of telecommunications traffic, having different financial values for an operator of the communications network, the system being coupled to receive information from the components about to monitor the flows in the network, and having being coupled to a store of value information based on one or more service level agreements relating to at least some of the flows, the value information indicating one or both of a positive revenue from the successful operation of the flow, and a negative revenue if the flow is degraded, the system further comprising:

a flow identifier part for using the information about the flows in the network to determine and output an indication of identifying which of the monitored flows of traffic rely on a given one or more of the components, and a valuer part arranged to receive the indication of which of the monitored flows of traffic rely on the given one or more of the components, and arranged to use that indication to retrieve corresponding value information for the indicated flows from the store, and to use that corresponding value information to determine a total value of the indicated identified flows from the store of value information relating to the identified flows.

2. The system of claim 1, being coupled to a display and being arranged to display the total value on the display.

3. The system of claim 2, having an interface arranged to receive a request identifying the given or more components and arranged to send the total value to a remote terminal for display.

4. The system of claim 2, having an interface for coupling to a centralized network reconfiguration system, the display being on an operator terminal of the reconfiguration system.

5. The system of claim 1, having an interface for coupling to a centralized network reconfiguration system to enable reconfiguration of the given one or more components only if the total value does not exceed a pre-determined threshold.

6. The system of claim 1, further having a value map generator arranged to determine the total values for many of the components, to create a value map of part or all of the network.

7. The system of claim 1, the network being a wide area optical wavelength division multiplexed transport network.

8. The system of claim 1, having an adjuster arranged to adjust the total value by determining determine if the identified indicated flows have protection paths not relying on the given one or more components, and if any of the flows rely on the given one or more components not for transmission but only for a protection path, and adjusting to adjust the total value accordingly to these determinations.

9. The system of claim 1, having an adjuster arranged to determine an adjusted total value taking into account how long the given component could be degraded.

10. The system of claim 1, having an accuracy determiner arranged to determine a level of accuracy of the total value.

11. The system of claim 1, the flow identifier part and the valuer part being implemented in the form of software on a computer readable medium.

12. A method of monitoring a communications network, the network being made up of many components, and arranged for carrying many flows of telecommunications traffic having different financial values, the system being coupled to the components to monitor the flows in the network, and having a store of value information based on one or more service level agreements relating to at least some of the flows, the value information indicating one or both of a positive revenue from the successful operation of the flow, and a negative revenue if the flow is degraded, the method having the steps of:

determing identifying which of the flows of traffic rely on a given one or more of the components, and retrieving from the store corresponding value information for these flows and determining from the corresponding value information a total value of these the identified flows from the store of value information relating to the identified flows.

13. A system for determining a cost benefit ratio of a given component of a communications network, the system comprising the monitoring system of claim 1, and the system further being arranged to receive from the monitoring system a number of total values determined at different points in time for the given component and having an averager arranged to determine an average of the total value for the given component over a predetermined period of time, and to use the average, and a cost of the given component to determine the cost benefit ratio for the given component a ratio determiner arranged to combine the average with a component cost.

14. A system for alerting a craftsperson at a remote location of information relating to traffic flows currently flowing through or relying on a given component of a communications network, the system comprising:

The monitoring system of claim 1, a component identifier arranged to send information identifying the given component to the a monitoring system as set out in claim 1, and a value sender arranged to send the total value for the given component, generated by the monitoring system, to the remote terminal for use by the craftsperson.

15. The system of claim 14, further having an arrangement for automated entry of the information identifying the given component.

16. A system for monitoring a communications network, comprising many components, and being arranged for carrying many flows of telecommunications traffic, having different financial values for an operator of the network, the system being coupled to receive information from the components to monitor the flows in the network, and having being coupled to a store of value information based on one or more service level agreements relating to at least some of the flows, the value information indicating one or both of a positive revenue from the successful operation of the flow, and a negative revenue if the flow is degraded, the system further comprising:

means for identifying which of the monitored flows of traffic rely on a given one or more of the components and outputting an indication of these flows, and means for using the indication to retrieve corresponding value information for these flows from the store, and to use that corresponding value information to determine determining a total value of the indicated identified flows from the store of value information relating to the identified flows.

* * * * *